United States Patent
Bunch et al.

(10) Patent No.: US 8,228,227 B2
(45) Date of Patent: Jul. 24, 2012

(54) SYSTEMS AND METHODS FOR IMPROVING RELEVANT WEATHER DETERMINATION

(75) Inventors: Brian P. Bunch, Snohomish, WA (US); Paul Christianson, Seattle, WA (US)

(73) Assignee: Honeywell International Inc., Morristown, NJ (US)

(*) Notice: Subject to any disclaimer, the term of this patent is extended or adjusted under 35 U.S.C. 154(b) by 68 days.

(21) Appl. No.: 12/959,240

(22) Filed: Dec. 2, 2010

(65) Prior Publication Data
US 2012/0139778 A1    Jun. 7, 2012

(51) Int. Cl.
*G01S 13/95* (2006.01)
(52) U.S. Cl. .......................... 342/26 B; 342/91; 342/180
(58) Field of Classification Search ................ 342/26 R, 342/26 B, 89, 91, 180
See application file for complete search history.

(56) References Cited

U.S. PATENT DOCUMENTS

| | | | |
|---|---|---|---|
| RE33,152 E * | 1/1990 | Atlas ........................... | 342/26 R |
| 5,907,568 A * | 5/1999 | Reitan, Jr. ................... | 342/26 B |
| 6,236,351 B1 * | 5/2001 | Conner et al. ............... | 342/26 B |
| 6,707,415 B1 | 3/2004 | Christianson | |
| 7,242,343 B1 * | 7/2007 | Woodell ...................... | 342/26 B |
| 7,307,577 B1 * | 12/2007 | Kronfeld et al. ............ | 342/26 B |
| 7,427,943 B1 * | 9/2008 | Kronfeld et al. ............ | 342/26 B |
| 7,639,172 B2 * | 12/2009 | Chabah et al. ............. | 342/26 B |
| 7,688,254 B2 * | 3/2010 | Khatwa ........................ | 342/123 |
| 7,982,658 B2 * | 7/2011 | Kauffman et al. .......... | 342/26 B |
| 8,068,050 B2 * | 11/2011 | Christianson ............... | 342/26 B |
| 2003/0011505 A1 * | 1/2003 | Szeto et al. .................... | 342/26 |
| 2010/0201565 A1 * | 8/2010 | Khatwa ........................ | 342/26 B |
| 2010/0302093 A1 * | 12/2010 | Bunch et al. ................. | 342/26 B |
| 2012/0050073 A1 * | 3/2012 | Bunch et al. .................. | 340/971 |

* cited by examiner

*Primary Examiner* — John B Sotomayor
(74) *Attorney, Agent, or Firm* — Lowe Graham Jones PLLC

(57) ABSTRACT

Systems and methods for improving relevant weather determination for aircraft at altitude. An exemplary system includes a weather radar component and memory that stores weather radar data in a three-dimensional (3D) buffer. A processor calculates vertically integrated reflectivity using the stored weather radar data at a predefined reference altitude at one or more locations from the aircraft. The processor then adjusts a lower boundary of a relevant weather envelope from a first value to a second value, if the vertically integrated reflectivity is greater than a predefined threshold. The range of the adjusted lower boundary of the envelope is associated with the weather radar data having the calculated vertically integrated reflectivity greater than the predefined threshold. A display device displays the weather radar data located within the envelope in a first manner and displays the weather radar data located outside of the envelope in a second manner.

17 Claims, 7 Drawing Sheets

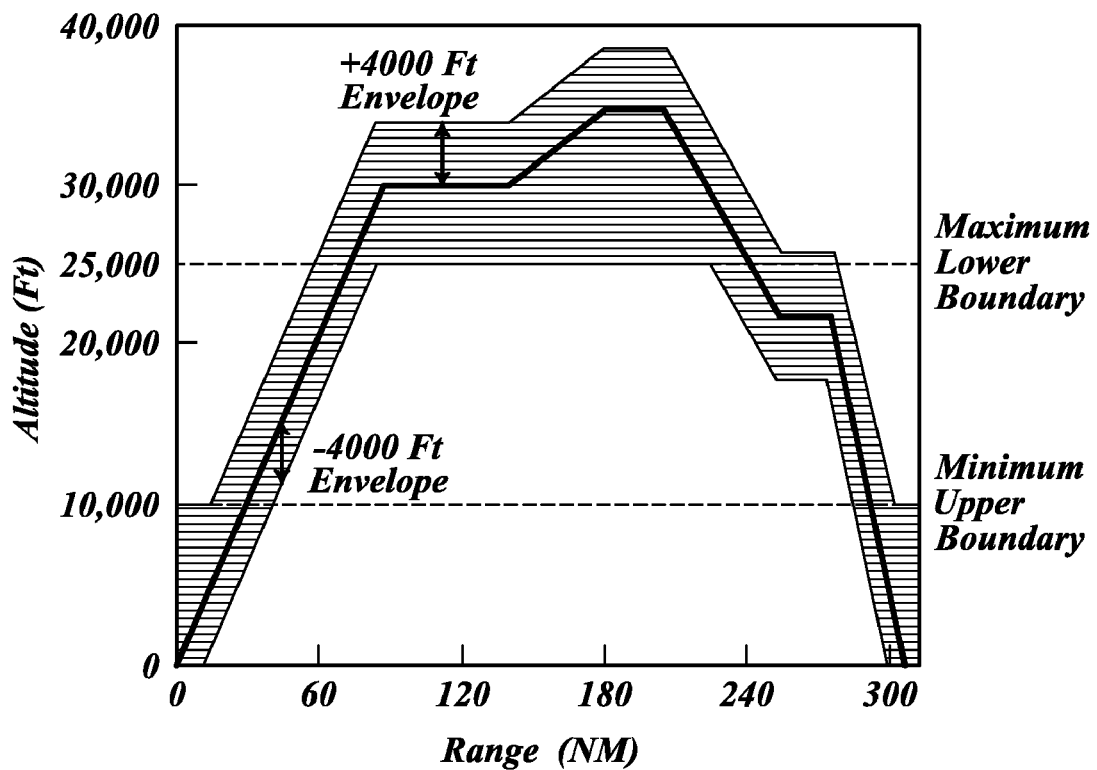
FIG.1 *(Prior Art)*

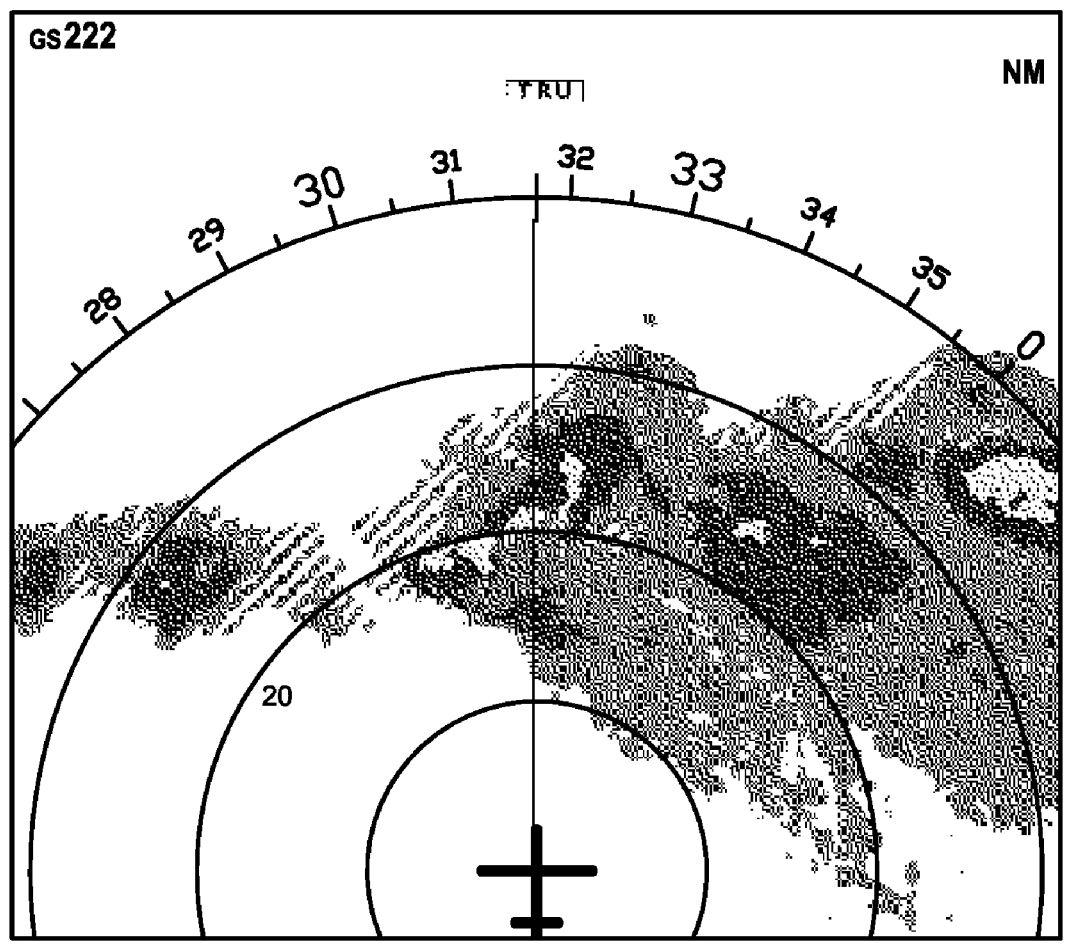
FIG. 2 *(Prior Art)*

SYSTEMS AND METHODS FOR IMPROVING RELEVANT WEATHER DETERMINATION

BACKGROUND OF THE INVENTION

The RDR-4000 IntuVue® radar incorporates a volumetric, 3D buffer concept that enables several features not previously available in airborne weather radar. One of those features is the Automatic mode which provides a display of weather relevant to the intended aircraft flight path (either via data from a flight management system or inferred from present altitude, vertical speed and/or ground speed).

Currently, the relevant weather is defined as a corridor (envelope) extending from 4000 ft above the intended aircraft flight path to 4000 ft below the aircraft intended flight path, with the following basic modifications:

the lower boundary is limited to a maximum value of 25,000 ft MSL;
the lower boundary is limited to a minimum value of 0 ft MSL (limit of the volumetric buffer);
the upper boundary is limited to a maximum value of 60,000 ft MSL (limit of the volumetric buffer); and
the upper boundary is limited to a minimum of 10,000 ft AGL or MSL (depending on aircraft type).

FIG. 1 illustrates these modifications.

The weather or more specifically, the reflectivity and turbulence data that is within the envelope is displayed on a horizontal display in solid colors (green, yellow, red). Reflectivity is the characteristic of weather that the radar system measures. Reflectivity provides a rough estimate of rainfall rate. The turbulence indications (usually display in magenta) indicate areas estimated by the radar to contain severe turbulence in areas of radar-detectable precipitation.

The color displayed at any point on the display is determined by the maximum reflectivity in the portion of the column above the earth inside the relevant envelope. For example, if any portion of the column inside the relevant envelop is red, the displayed value at the corresponding display point will be red. If the maximum value is yellow, the displayed value at the corresponding display point will be yellow, and similarly for green.

Weather that is outside the envelope is referred to as "non-relevant" weather and can either be suppressed (not displayed) or displayed as cross-hatched colors (depending on crew selection). If enabled for display, it is only displayed in areas where the relevant weather is below the green threshold. For display priority, any green or above relevant weather is overlaid on all non-relevant weather, for example, green relevant has priority over red non-relevant. An example of a display with the relevant (solid colors) and non-relevant (cross-hatched colors) is shown in FIG. 2.

The 25,000 ft limit on the lower boundary of the envelope was selected for meteorological reasons associated with the characteristics of convective weather (e.g. thunderstorms). Inherently, convective weather has vertical winds which can represent hazards to aircraft. The extent of these potentially hazardous vertical winds is not necessarily confined to or associated with regions of high reflectivity.

One of the reasons for this is that above the freezing altitude (the altitude of the 0° C. isotherm), much of the water is frozen. The higher the altitude above the freezing altitude, the higher percentage of frozen water. Frozen water ("ice") does not return as strong a signal to the radar as liquid water. All other things being equal (particle size and density), ice returns a factor of about 5 times less power (7 dB) than liquid water.

Although the radar compensates for the lower reflectivity factor of frozen water, to ensure that the most reflective part of a thunder cell is presented to the pilot, it is necessary that the part of the convective cell at or below the freezing altitude is included in the relevant envelope. Hence the selection of 25,000 ft which represents a good average 0° C. isotherm under conditions at which hazardous convective activity can exist, or at least represents a safe altitude at which high reflectivity will occur.

Operational experience over the last few years (since circa 2005) has indicated that under some circumstances, the use of the 25,000 ft Maximum Lower Boundary (MLB) has some side effects. These circumstances include high altitude operation (above 35,000 ft) in the presence of stratiform type weather or low-level and non-threatening convection.

Stratiform (non-convective) weather is characterized by low or non-existent vertical winds and is generally safe to fly above or through. It does not generally extend vertically to the altitudes that convective weather may, but it can on occasion extend to 25,000 ft. Non-threatening convective weather can also top out in the 25,000 ft range.

Further the altitude at which the radar "perceives" reflectivity to exist can be expanded to some degree by the fact that the beamwidth of the radar beam cannot be indefinitely made narrow. The degree to which the antenna beam "expands" the perceived reflectivity is a function of the beamwidth and the range from the radar to the weather. The antenna beamwidth narrowness is limited by physics for a given operating frequency and antenna size in an inverse relationship; that is beamwidth decreases with higher frequency and larger physical antenna size.

Therefore, there are occasions in which aircraft are flying at high altitudes where non-threatening weather below is indicated as "relevant", due to the 25,000 ft MLB. Further, these relevant indications often turn out to be non-relevant as the aircraft approaches 40 nm and the vertical beam extent decreases. This is later than is desirable for making an operational decision to efficiently avoid weather (i.e., if it is necessary to fly around or climb above weather, it is better to do it sooner rather than later).

SUMMARY OF THE INVENTION

The present invention provides systems and methods for improving relevant weather determination for aircraft at altitude. An exemplary system includes a weather radar component and memory that stores radar reflectivity and turbulence data (i.e., weather radar data) in a three-dimensional (3D) buffer. A processor calculates vertically integrated reflectivity using the stored weather radar data at a predefined reference altitude at one or more locations from the aircraft. The processor then adjusts a lower boundary of a relevant weather envelope from a first value to a second value, if the calculated vertically integrated reflectivity is greater than a predefined threshold. The range of the adjusted lower boundary of the relevant weather envelope is associated with the weather radar data having the calculated vertically integrated reflectivity greater than the predefined threshold. A display device displays the weather radar data located within the relevant weather envelope in a first manner and display the weather radar data located outside of the relevant weather envelope in a second manner.

In one aspect of the invention, the reference altitude is greater than 29,000 feet.

In another aspect of the invention, the second value is closer to at least one of a flight plan altitude or an altitude associated with flight path angle than the first value.

In yet another aspect of the invention, the first value is 25,000 feet and the second value is between 3,000 and 5,000 feet from the at least one of flight plan altitude or altitude associated with flight path angle.

BRIEF DESCRIPTION OF THE DRAWINGS

Preferred and alternative embodiments of the present invention are described in detail below with reference to the following drawings:

FIG. 1 is profile of an example flight profile and a relevant weather envelope formed in accordance with the prior art;

FIG. 2 is a weather radar image generated in accordance with the prior art;

FIGS. 8-1 is a weather radar image associated with the scenarios shown in FIGS. 5 and 7;

FIG. 8-2 is a weather radar image associated with the scenarios shown in FIGS. 4 and 6;

FIG. 9-1 is weather radar image generated in accordance with the prior art; and

FIG. 9-2 is weather radar image generated in accordance with the present invention.

DETAILED DESCRIPTION OF THE INVENTION

Figure 3:
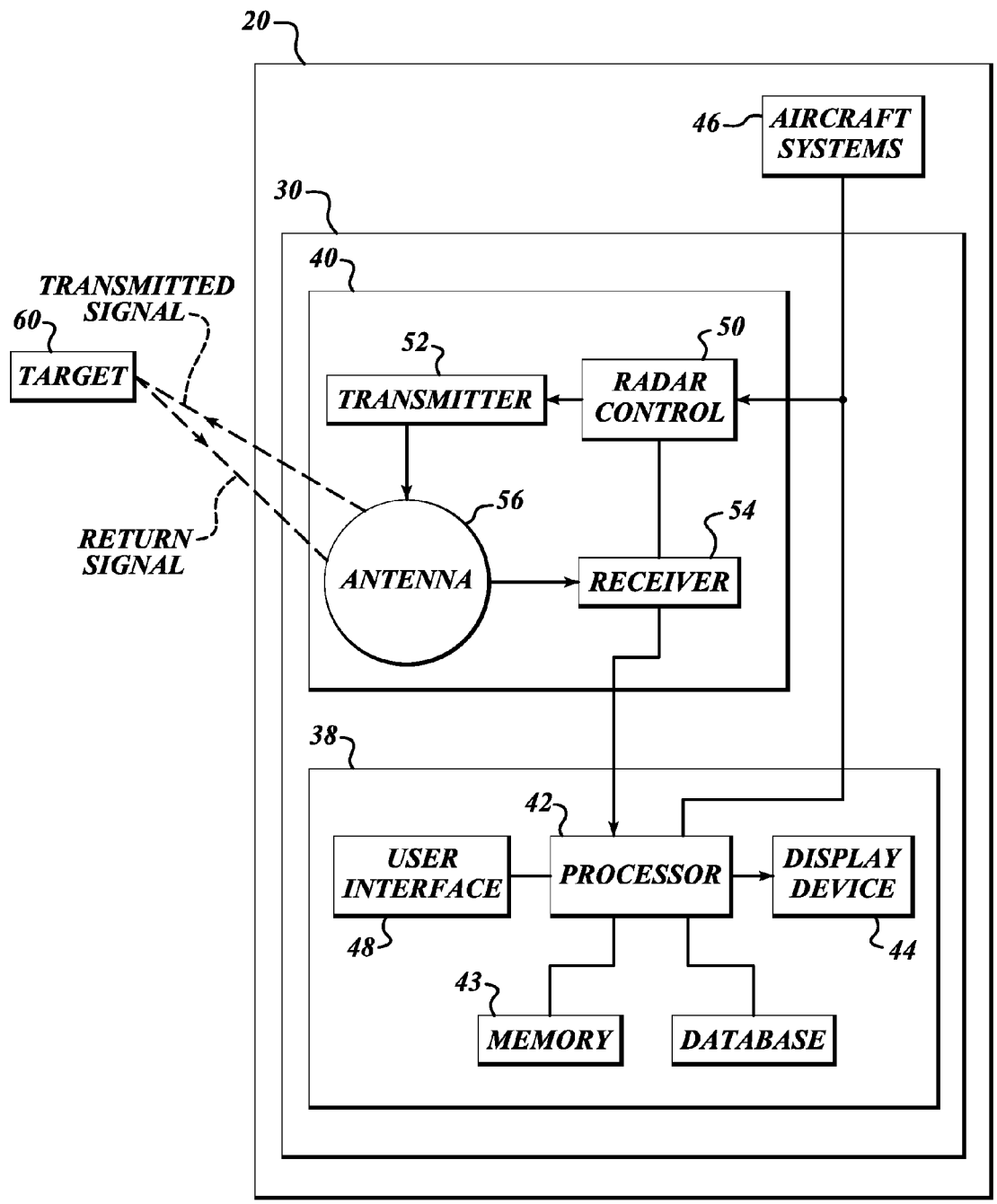
FIG. 3 illustrates an example radar system formed in accordance with an embodiment of the present invention.

FIG. 3 illustrates an example system 30 for providing more accurate flight plan/path weather information on an aircraft 20. The system 30 includes a radar display system 38 that includes a weather radar system 40, a display processor 42, memory 43, a display device 44, and a user interface 48 coupled to the display processor 42. The aircraft 20 also includes other aircraft systems 46, such as an air data computer (ADC), that are in signal communication with the weather radar system 40 and the radar display system 38. The display processor 42 is electrically coupled to the radar system 40, the display device 44, the ADC, and the memory 43. The radar system 40 includes a radar controller 50, a transmitter 52, a receiver 54, an antenna 56, and an antenna controller 61. The radar controller 50 controls the transmitter 52 and the receiver 54 for performing the transmitting and receiving of signals through the antenna 56 based on the selected radar mode and other pilot inputs received from the user interface 48, and aircraft data (i.e., altitude, speed, position, heading, roll, yaw, pitch, etc.) received from the ADC, a Flight Management System (FMS), Inertial Navigation System (INS), and/or Global Positioning System (GPS) (not shown). The ADC generates air data based on signals received from various aircraft flight systems.

The radar system 40 transmits radar signals from the transmitter 52 and directed out the antenna 56 into space, in a direction determined by the antenna controller 61, and detects return signals with the receiver 54 if a target 60 is present to scatter energy back to the receiver. Preferably, the radar system 40 digitizes the return signals and sends the digitized signals to the display processor 42. The display processor 42 translates the received return signals for storage in a multi-dimensional buffer in the memory 43. The display processor 42 then generates a two-dimensional image for presentation on the display device 44 based on any control signals sent from the User Interface 48 or based on signals from the radar system 40.

U.S. patent application Ser. No. 12/640,976 filed Dec. 12, 2009 to Christianson, which is hereby incorporated by reference, discloses a method for discriminating between threatening and non-threatening weather using a Vertically Integrated Reflectivity (VIR) calculation.

VIR data includes the sum of reflectivity values stored in a column of cells in the three-dimensional buffer or an integration of the values in the column of cells is performed. The system 30 vertically integrates the product of reflectivity values and altitude, each raised to some power.

In one embodiment, an approximation of that integral is performed by $$\sum_{i=1}^{N} Z_i^a h_i^b \Delta h$$

where $Z_i$ is the reflectivity of the i-th cell in the column, $h_i$ is the altitude of the i-th cell in the column, N is the number of cells in the column in the 3D buffer, and $\Delta h$ is the vertical size of the buffer cell. If a=1 and b=0 are used as the power values, then this is just a straight vertical integration of reflectivity (i.e., VIR). To compute vertically integrated liquid (VIL), which is a quantity that has been generated in the past using ground-based radar data, b=0, a=4/7 are used, and the result is multiplied by a factor of 3.44e−6. This factor and the 4/7 exponent are taken from a power law relationship between weather reflectivity and liquid water content (LWC), which has units of kg/m³.

In another embodiment, a=4/7, b=1 are used as the power values. This turns the result into something like a potential energy. Potential energy of a mass (m) lofted to a height (h) is given by PE=mgh, where g is the gravitational acceleration. So if the reflectivity is converted to LWC (which is a mass-like quantity), times an altitude, the result is proportional to the energy that the vertical motion has expended to loft the water up into the atmosphere. More energetic vertical motion is expected to generate more energetic turbulence.

The present invention uses the VIR calculation to modify the relevant envelope by eliminating the 25,000 ft mean sea level (MSL) Maximum Lower Boundary (MLB), except for locations where a moderate or greater hazard level at the reference altitude level exists. In that case (existing moderate or greater hazard level), the MLB is set to 25,000 ft as before. If a moderate hazard condition is not detected at the reference altitude, the relevant envelope is just the nominal ±4000 ft about the intended flight path.

In an automatic mode of operation, the reference altitude is the intended altitude as a function of range (e.g., could have one value for 10 nm and another for 20 nm, etc.). If there is a valid flight plan (as provided by the FMS or comparable device), then the reference altitude is based on the vertical profile of that flight plan. If there is no valid flight plan, the reference altitude is based on the current flight path angle. If the aircraft is flying level, then the reference altitude is just the current altitude.

In a manual mode of operation, the reference altitude is selected by the pilot. The manually selected reference altitude is a horizontal altitude slice. Other types of reference altitudes may be manually selected.

Figure 4:
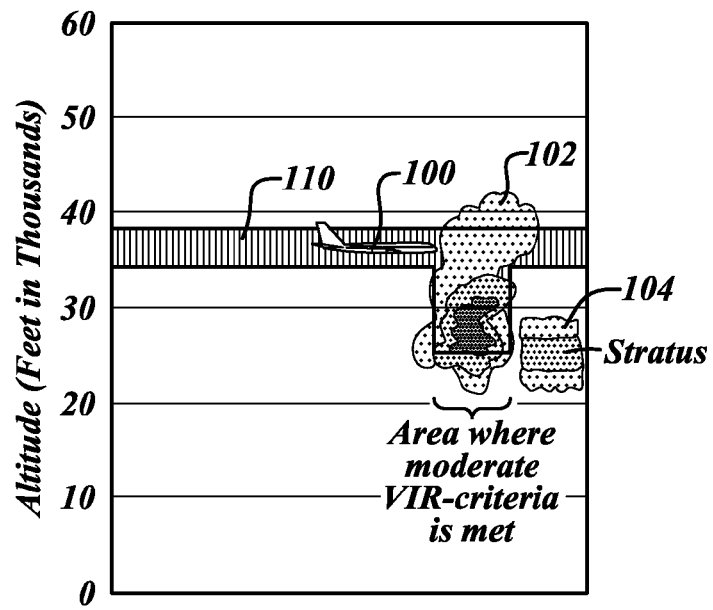
FIGS. 4 and 6 are profile views of relevant weather envelopes formed in accordance with the present invention.

FIG. 4 shows a vertical profile of an aircraft 100 that is flying at flight level (FL) 35,000 feet (350). In this situation, the reference altitude is FL350 because FL350 is either the valid flight plan altitude for the next n nautical miles (nm), the current altitude of the aircraft 100 or current flight path angle of the aircraft 100 (auto mode) or the pilot selected altitude (manual mode.) The weather radar data located in a first area 102 includes VIR data that is identified as moderate or higher at the reference altitude (FL350.) The stratus related reflectivity data shown in a second area 104 is associated with VIR data that is less than moderate at the reference altitude (FL350.) Therefore, the relevant weather envelope 110 is returned to the FL250 MLB in the ranges associated with the first area 102, but in the ranges associated with the second area 104 the MLB of the relevant weather envelope 110 remains at FL310 (i.e., 4 k feet below the relevant altitude). So, the weather radar data in the first area 102 within the modified relevant weather envelope 110 is displayed on the display device 44 as relevant. The weather radar data in the second area 104 is displayed on the display device 44 as non-relevant.

Figure 5:
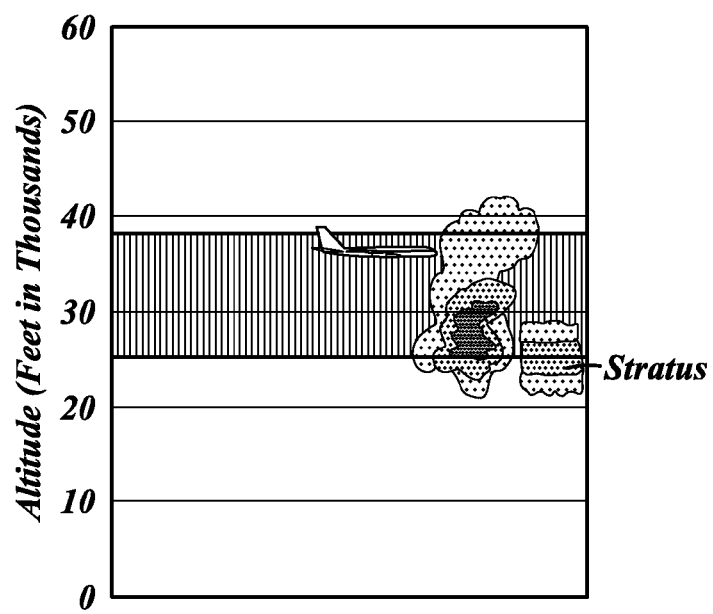
FIGS. 5 and 7 are profile views of relevant weather envelopes formed in accordance with the prior art in contrast to those shown in FIGS. 4 and 6, respectively.

FIG. 5 shows the vertical profile of FIG. 4 without the relevant weather envelope being adjusted according to the present invention.

Figure 6:
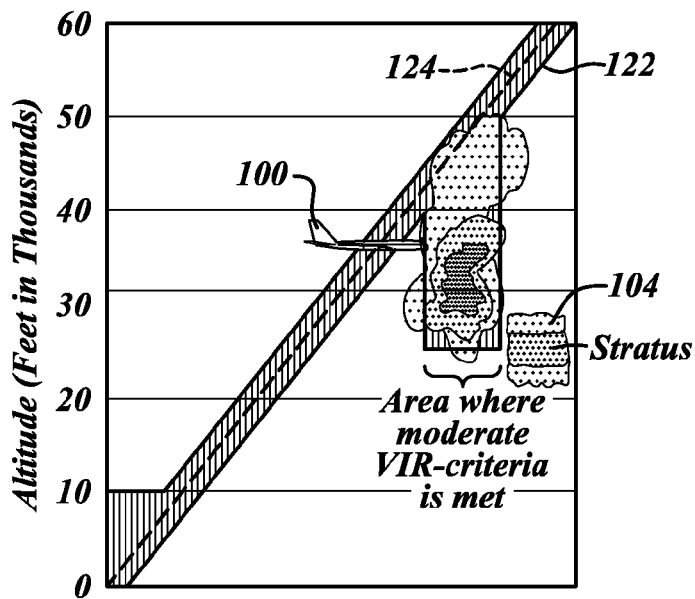

FIG. 6 is similar to FIG. 4 except a relevant weather envelope 122 and a reference altitude 124 are based on a climb profile (flight plan or flight path angle) of an aircraft 120. Modulation of the relevant weather envelope 122 operates the same as described above except the reference altitude 124 changes over distance.

Figure 7:
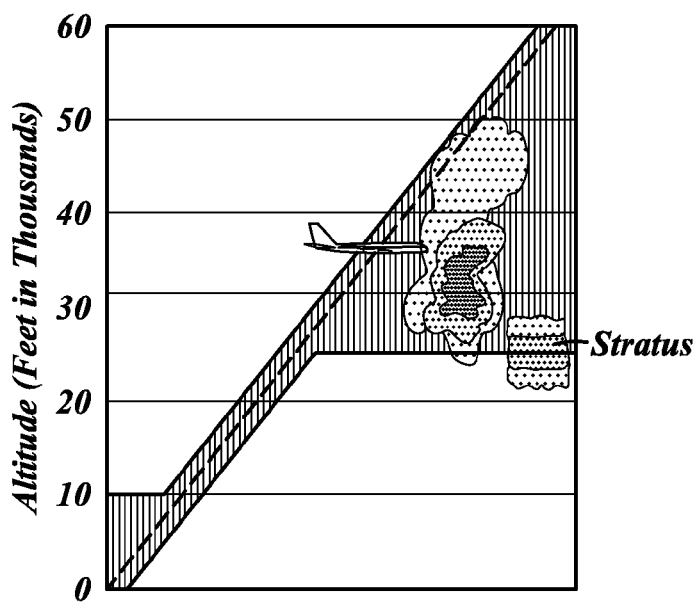

FIG. 7 shows the vertical profile of FIG. 4 without the relevant weather envelope being adjusted according to the present invention.

Figures 1, 8:
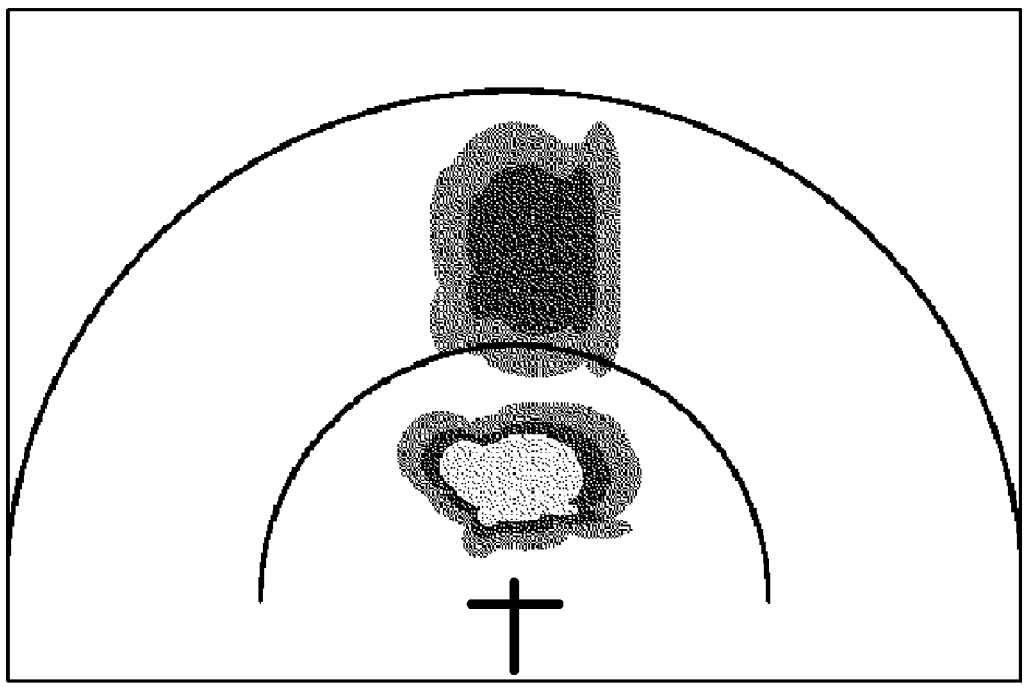

FIG. 8-1 is a weather radar image presented on a weather radar display device based on the envelopes shown in FIGS. 5 and 7. Both the relevant and irrelevant weather anomalies are presented in solid color.

Figures 2, 8:
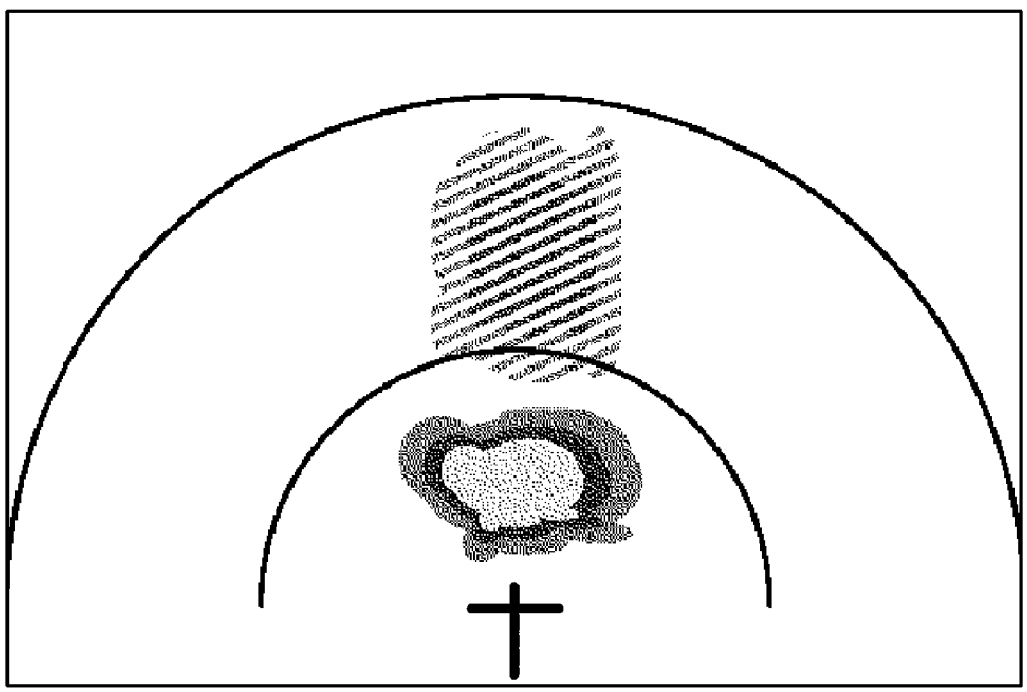

FIG. 8-2 is a weather radar image associated with the scenarios shown in FIGS. 4 and 6. Only the relevant anomaly is presented in solid color. The irrelevant weather anomaly is present in cross-hatched colors.

Figures 1, 9:
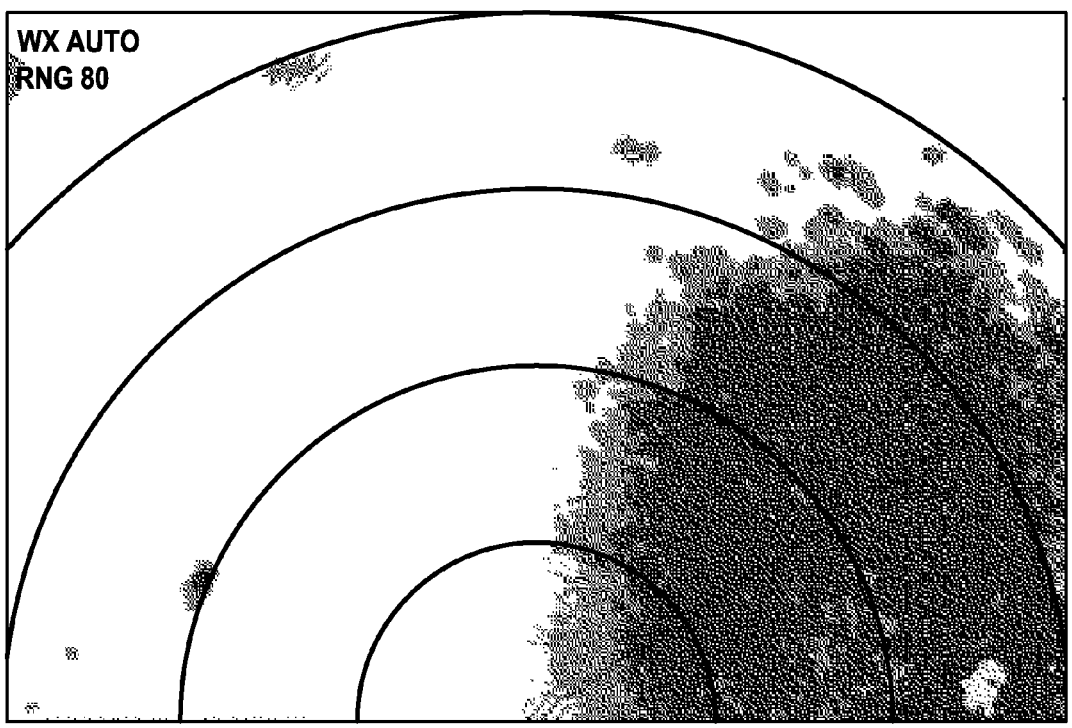
Figures 2, 9:
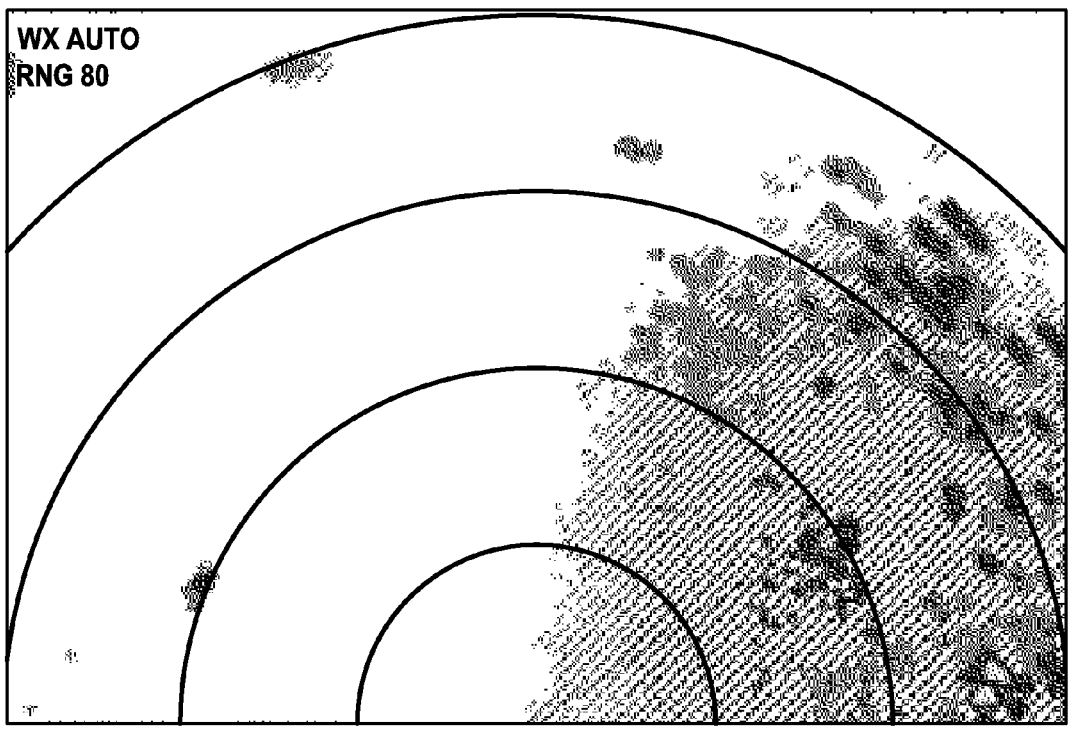

FIG. 9-1 shows a weather radar display formed according to the prior art for an aircraft currently flying around FL350. Because the weather radar data is assigned relevance based on a the relevant weather envelope with a MLB set at FL250, almost all of the sensed weather radar data is identified as relevant (i.e., solid colors.) The weather radar data identified as non-relevant is, shown as cross-hatched colors. As shown in FIG. 9-2, the same weather radar data as used in FIG. 9-1 is processed according to the present invention. According to the modified relevant weather envelope only a small fraction of the weather radar data is determined relevant. Thus, if the flight plan required (or pilot desired) a 45° turn to starboard, the pilot would most likely request a deviation for that 45° heading in order to avoid the displayed relevant weather. However, the pilot may delay or not perform a request to deviate from the 45° heading change if the display shown in FIG. 9-2 was viewed. This is because very little actual relevant weather is occurring.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method performed by a system on an aircraft, the method comprising:
   receiving weather radar data;
   storing the received weather radar data in a three-dimensional (3D) memory;
   calculating vertically integrated reflectivity using the stored weather radar data at a predefined reference altitude at one or more locations from the aircraft;
   adjusting a lower boundary of a relevant weather envelope from a first value to a second value, if the calculated vertically integrated reflectivity is greater than a predefined threshold,
   wherein range of the adjusted lower boundary of the relevant weather envelope is associated with the weather radar data having the calculated vertically integrated reflectivity greater than the predefined threshold.

2. The method of claim 1, wherein the reference altitude is greater than 29,000 feet.

3. The method of claim 2, wherein the first value is closer to at least one of a flight plan altitude or an altitude associated with flight path angle than the second value.

4. The method of claim 3, wherein the second value is 25,000 feet.

5. The method of claim 4, wherein the first value is between 3,000 and 5,000 feet from the at least one of flight plan altitude or altitude associated with flight path angle.

6. The method of claim 1, further comprising:
   displaying on a display device the weather radar data located within the relevant weather envelope in a first manner; and
   displaying on the display device the weather radar data located outside of the relevant weather envelope in a second manner.

7. A system on an aircraft, the system having a weather radar component that generates weather radar data, the system comprising:
   memory configured to receive and store weather radar data in a three-dimensional (3D) buffer;
   a processor configured to
      calculate vertically integrated reflectivity using the stored weather radar data at a predefined reference altitude at one or more locations from the aircraft;
      adjust a lower boundary of a relevant weather envelope from a first value to a second value, if the calculated vertically integrated reflectivity is greater than a predefined threshold,
      wherein range of the adjusted lower boundary of the relevant weather envelope is associated with the weather radar data having the calculated vertically integrated reflectivity greater than the predefined threshold; and
   a display device configured to display the weather radar data located within the relevant weather envelope in a first manner and display the weather radar data located outside of the relevant weather envelope in a second manner.

8. The system of claim 7, wherein the reference altitude is greater than 29,000 feet.

9. The system of claim 8, wherein the first value is closer to at least one of a flight plan altitude or an altitude associated with flight path angle than the second value.

10. The system of claim 9, wherein the second value is 25,000 feet.

11. The system of claim 10, wherein the first value is between 3,000 and 5,000 feet from the at least one of flight plan altitude or altitude associated with flight path angle.

12. A system on an aircraft, the system comprising:
   a means for receiving weather radar data;
   a means for storing the received weather radar data in a three-dimensional (3D) memory;

a means for calculating vertically integrated reflectivity using the stored weather radar data at a predefined reference altitude at one or more locations from the aircraft;

a means for adjusting a lower boundary of a relevant weather envelope from a first value to a second value, if the calculated vertically integrated reflectivity is greater than a predefined threshold, wherein range of the adjusted lower boundary of the relevant weather envelope is associated with the weather radar data having the calculated vertically integrated reflectivity greater than the predefined threshold.

13. The system of claim 12, wherein the reference altitude is greater than 29,000 feet.

14. The system of claim 13, wherein the first value is closer to at least one of a flight plan altitude or an altitude associated with flight path angle than the second value.

15. The system of claim 14, wherein the second value is 25,000 feet.

16. The system of claim 15, wherein the first value is between 3,000 and 5,000 feet from the at least one of flight plan altitude or altitude associated with flight path angle.

17. The system of claim 12, further comprising:

a means for displaying on a display device the weather radar data located within the relevant weather envelope in a first manner and displaying on a display device the weather radar data located outside of the relevant weather envelope in a second manner.

\* \* \* \* \*